United States Patent
Li et al.

(10) Patent No.: US 8,823,211 B2
(45) Date of Patent: Sep. 2, 2014

(54) PHOTOVOLTAIC INVERTER AND METHOD FOR CONTROLLING PHOTOVOLTAIC INVERTER

(75) Inventors: Sheng-Hua Li, Taoyuan Hsien (TW); Chi-Hsien Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 489 days.

(21) Appl. No.: 13/243,603

(22) Filed: Sep. 23, 2011

(65) Prior Publication Data
US 2012/0235486 A1 Sep. 20, 2012

(30) Foreign Application Priority Data
Mar. 16, 2011 (TW) .............................. 100108842 A

(51) Int. Cl.
*H02J 1/12* (2006.01)
(52) U.S. Cl.
USPC ........................................................... 307/46
(58) Field of Classification Search
USPC ........................................................... 307/46
See application file for complete search history.

(56) References Cited

U.S. PATENT DOCUMENTS
2007/0221267 A1* 9/2007 Fornage .................... 136/244

FOREIGN PATENT DOCUMENTS

| CN | 201113494 Y | 9/2008 |
|---|---|---|
| JP | 2003-195957 A | 7/2003 |
| JP | 2008-257309 A | 10/2008 |
| JP | 2009-247184 A | 10/2009 |

* cited by examiner

*Primary Examiner* — Robert L. Deberadinis
(74) *Attorney, Agent, or Firm* — Muncy, Geissler, Olds & Lowe, P.C.

(57) ABSTRACT

A photovoltaic inverter is provided, having a controller, an auxiliary power and a buffering element. The auxiliary power provides power to the controller. The buffering element is coupled between a photovoltaic panel and the auxiliary power such that the buffering element stores energy output from the photovoltaic panel first during a startup period, and then stops storing energy output from the photovoltaic panel and provides the stored energy to the auxiliary power, thereby performing a maximum power point tracking procedure on the photovoltaic panel during a first period following the startup period, and feeds energy output from the photovoltaic panel to the auxiliary power during a second period following the first period thereby continuously performing the maximum power point tracking procedure on the photovoltaic panel by the controller.

20 Claims, 5 Drawing Sheets

PHOTOVOLTAIC INVERTER AND METHOD FOR CONTROLLING PHOTOVOLTAIC INVERTER

CROSS REFERENCE TO RELATED APPLICATIONS

This application claims priority of Taiwan Patent Application No. 100108842, filed on Mar. 16, 2011, the entirety of which is incorporated by reference herein.

BACKGROUND OF THE INVENTION

1. Field of the Invention

The present invention relates to photovoltaic conversion systems, and in particular relates to photovoltaic inverters.

2. Description of the Related Art

FIG. 1 depicts a photovoltaic panel of the prior art. As shown in FIG. 1, the input terminal of an auxiliary power 12 is coupled to a photovoltaic panel 18 and the output terminal of the auxiliary power 12 is coupled to a controller 11. FIG. 2 depicts the relationship between voltage, current and power of the photovoltaic panel in different kinds of luminance of the sunlight. According to FIG. 2, the output voltage of the photovoltaic panel 18 changes in correspondence to the luminance of the sunlight. Therefore, the input terminal of the auxiliary power 12 must receive the voltage, having a wide range (such as 20 Vdc~50 Vdc), output from the photovoltaic panel 18. But the voltage output from the output terminal of the auxiliary power 12 is fixed (e.g., 12V, 5V or 3.3V, etc). Thus, when the difference between the voltage of the input terminal of the auxiliary power 12 and the voltage which force the auxiliary power 12 to operate at a best conversion efficiency (e.g., 35V or 25V) is too much, the conversion efficiency of the auxiliary power 12 is decreased and power consumption is increased.

On the other hand, when the luminance of the sunlight is not enough (e.g., the luminance of the sunlight is lower than 100 W/m$^2$ or the open-circuit voltage of the open-circuit voltage is lower than 40V) and the controller 11 performs a maximum power point tracking (MPPT) on the photovoltaic panel 18, the voltage output from the photovoltaic panel 18 is lower than a startup voltage (e.g., 25V) of the auxiliary power 12 such that a photovoltaic inverter 10 is turned off. Then, the controller 11 stops performing the maximum power point tracking procedure on the photovoltaic panel 18 such that the voltage output from the photovoltaic panel 18 exceeds the open-circuit voltage (e.g., 40V) of the luminance and the open-circuit voltage of the luminance is higher than the startup voltage of the auxiliary power 12, thereby turning on the auxiliary power 12 again. Because of turning on of the auxiliary power 12 again, the controller 11 performs the maximum power point tracking procedure on the photovoltaic panel 18 again such that the photovoltaic inverter 10 is turned off again. The photovoltaic inverter 10 is turned off and on repeatedly and the energy output from the photovoltaic panel 18 is not efficiently collected. Thus, there is a need for a new photovoltaic inverter to overcome such problem.

BRIEF SUMMARY OF THE INVENTION

In light of the previously described problems, the invention provides an embodiment of a photovoltaic inverter, comprising a controller, an auxiliary power and a buffering element. The auxiliary power provides power to the controller. The buffering element is coupled between a photovoltaic panel and the auxiliary power such that the buffering element stores energy output from the photovoltaic panel first during a startup period, and then stops storing energy output from the photovoltaic panel and provides the stored energy to the auxiliary power, thereby performing a maximum power point tracking procedure on the photovoltaic panel during a first period following the startup period, and feeds energy output from the photovoltaic panel to the auxiliary power during a second period following the first period thereby continuously performing the maximum power point tracking procedure on the photovoltaic panel by the controller.

The invention also provides an embodiment of a photovoltaic inverter, comprising a controller, an auxiliary power and a buffering element. The controller detects an open-circuit voltage of a photovoltaic panel. The auxiliary power provides power to the controller. The buffering element is coupled between the photovoltaic panel and the auxiliary power, wherein the controller enables the buffering element to store energy output from the photovoltaic panel and suspends a maximum power point tracking procedure on the photovoltaic panel when the photovoltaic panel is irradiated and the open-circuit voltage is lower than a first voltage.

The invention also provides a method for controlling photovoltaic inverters. The method comprises steps of: detecting an open-circuit voltage of a photovoltaic panel when the photovoltaic panel is irradiated; and storing energy output from the photovoltaic panel to a storage element and suspending a maximum power point tracking procedure on the photovoltaic panel when the open-circuit voltage is lower than a first voltage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
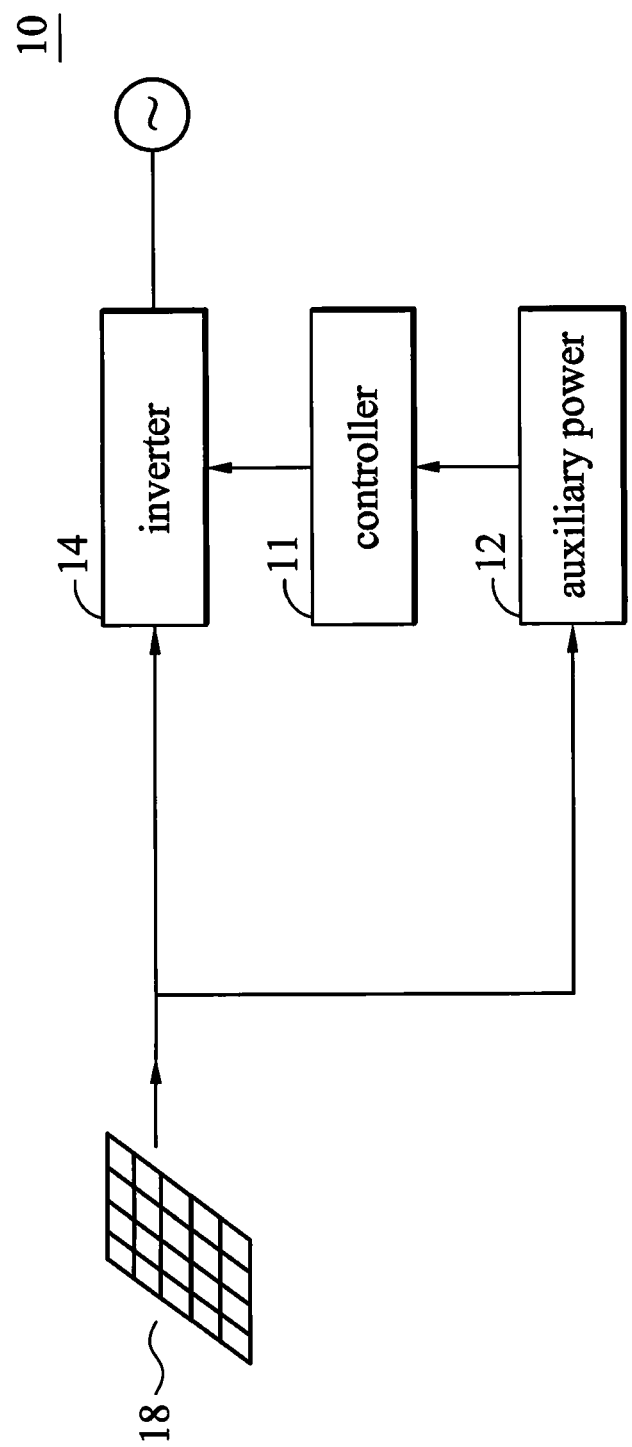
FIG. 1 depicts a photovoltaic panel of the prior art.
Figure 2:
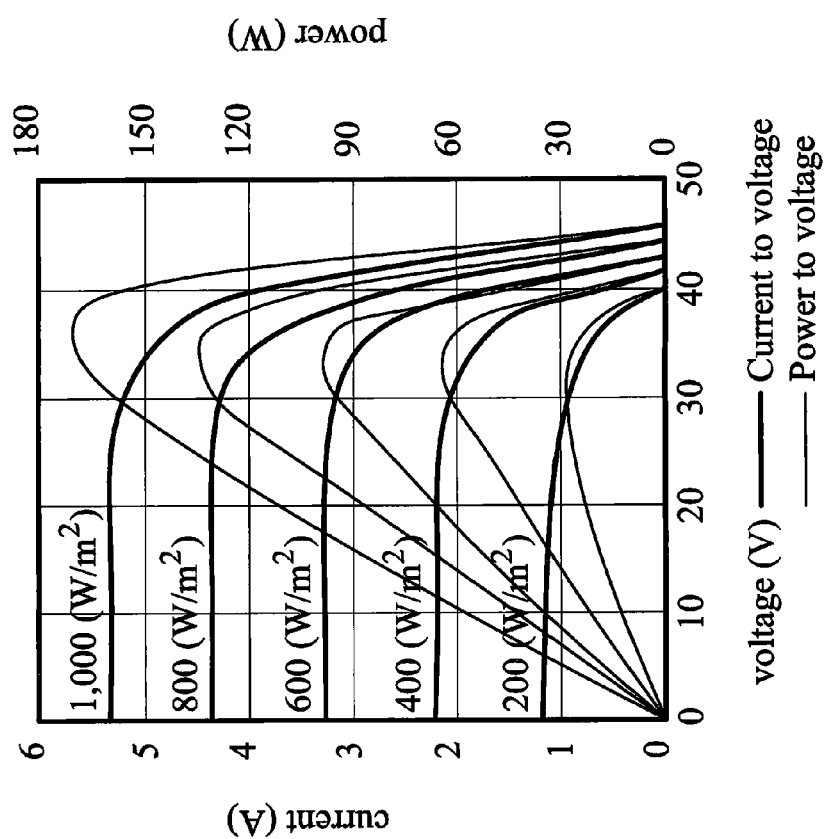
FIG. 2 depicts the relationship between voltage, current and power of the photovoltaic panel in different kinds of luminance of the sunlight.
Figure 3:
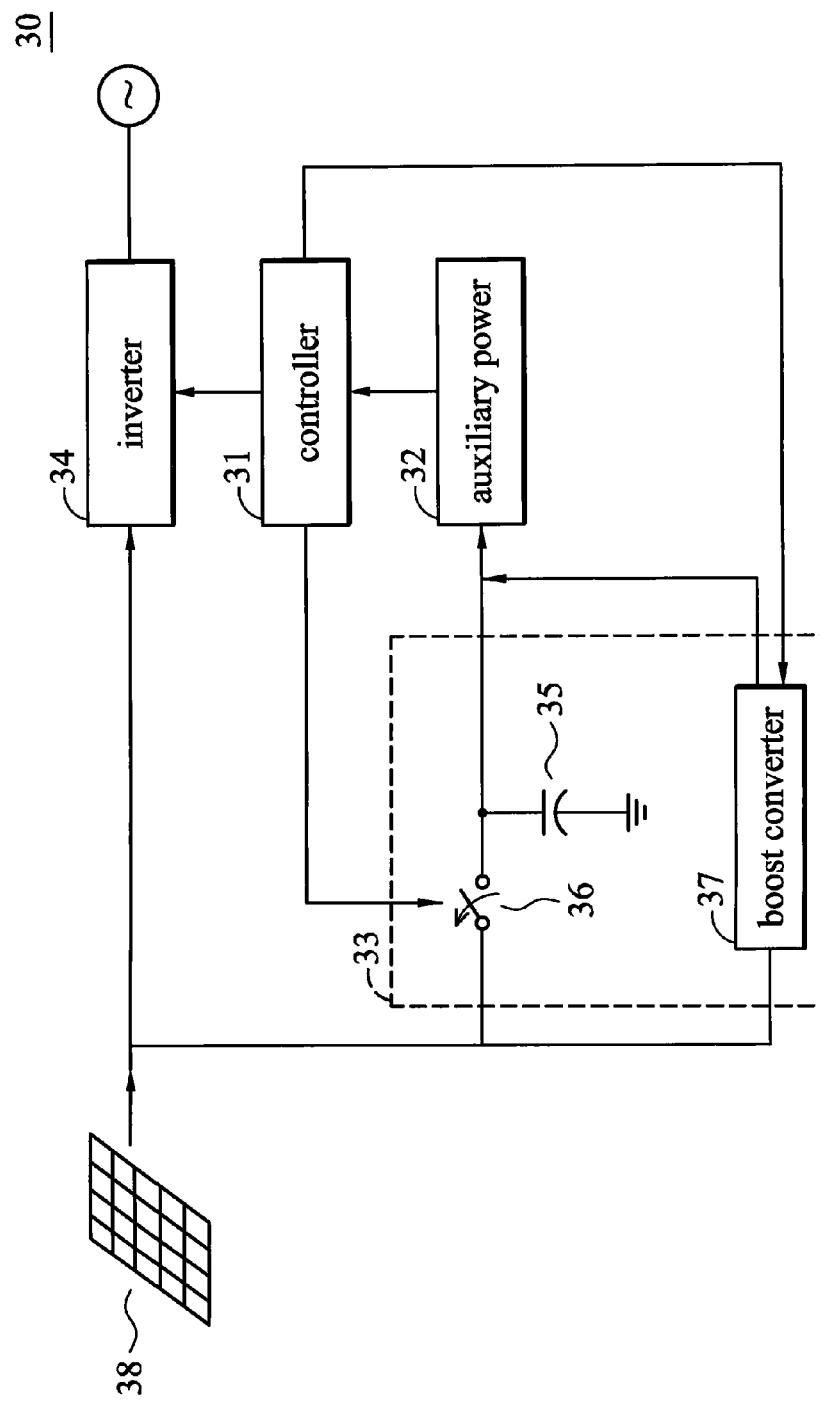
FIG. 3 depicts an embodiment of the photovoltaic inverter of the disclosure.

FIG. 3 depicts an embodiment of the photovoltaic inverter of the disclosure. As shown in FIG. 3, the photovoltaic inverter 30 comprises a controller 31, an auxiliary power 32, a buffering element 33 and an inverter 34. For example, the controller 31 detects an open-circuit voltage of a photovoltaic panel 38 and controls the buffering element 33 and the inverter 34. The inverter 34 adjusts the voltage and current output from the photovoltaic panel 38 according to the controller 31, thereby obtaining maximum power. The auxiliary power 32 has an input terminal coupled to the buffering element 33 and an output terminal coupled to the controller 31, thereby providing energy to the controller 31. The buffering element 33 is coupled between the photovoltaic panel 38 and the auxiliary power 32, wherein the buffering element 33 comprises a storage element 35, a switching element 36 and a boost converter 37. For example, the switching element 36 is coupled between the photovoltaic panel 38 and the storage element 35, thereby storing the energy output from the photovoltaic panel 38 in the storage element 35 or directly feeding the energy output from the photovoltaic panel 38 to the auxiliary power 32, according to the controller 31. The boost converter 37 provides the voltage to the auxiliary power 32 according to the controller 31.

The controller 31 enables the buffering element 33 to store the energy output from the photovoltaic panel 38 and suspends a maximum power point tracking (MPPT) procedure on the photovoltaic panel 38, when the photovoltaic panel 38 is irradiated and the open-circuit voltage is lower than a voltage V1 (e.g., 50V). In this embodiment, the switching element 36 is normal-on (i.e., close-circuit state), but is not limited thereto. In detail, the controller 31 enables the switching element 36 to be in the close-circuit state such that the energy output from the photovoltaic panel 38 is stored in the storage element 35 when the photovoltaic panel 38 is irradiated and the open-circuit voltage is lower than the voltage V1.

When the photovoltaic panel 38 is irradiated and the open-circuit voltage is higher than the voltage V1, the controller 31 enables the switching element 36 to be in the open-circuit state such that the storage element 35 of the buffering element 33 stops storing the energy output from the photovoltaic panel 38 and the stored energy is provided to the auxiliary power 32, thereby performing the maximum power point tracking procedure on the photovoltaic panel 38 by the controller 31. When the controller 31 performs the maximum power point tracking procedure on the photovoltaic panel 38 and the voltage output from the photovoltaic panel 38 is lower than a voltage V2 (e.g., 35V), the controller 31 enables the switching element 36 to be in the close-circuit state such that the buffering element 33 feeds the energy output from the photovoltaic panel 38 to the auxiliary power 32, thereby continuously performing the maximum power point tracking procedure on the photovoltaic panel 38 by the controller 31.

When the controller 31 performs the maximum power point tracking procedure on the photovoltaic panel 38 and the voltage output from the photovoltaic panel 38 is lower than a voltage V3 (e.g., 25V), the controller 31 enables the switching element 36 to be in the open-circuit state and turns on the boost converter 37 such that the boost converter 37 increases the voltage output from the photovoltaic panel 38 to the voltage V3 and provides the voltage V3 to the auxiliary power 32, thereby continuously performing the maximum power point tracking procedure on the photovoltaic panel 38 by the controller 31.

When the photovoltaic panel 38 is not irradiated (e.g., after sunset), the photovoltaic inverter 30 is turned off and the switching element 36 is in the close-circuit state, such that the photovoltaic panel 38 charges the storage element 35 when the photovoltaic panel 38 is irradiated (e.g., after dawn) again.

Figure 4:
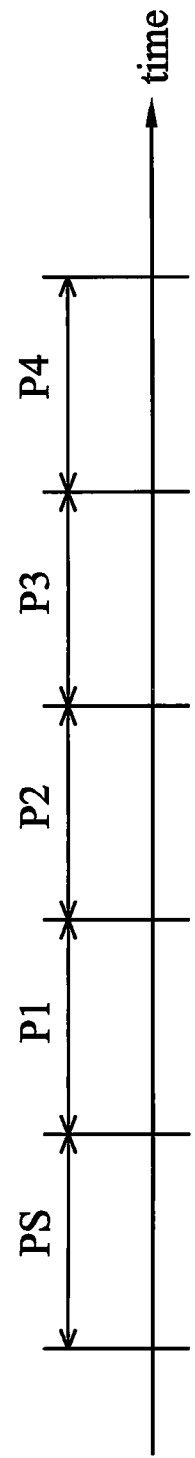
FIG. 4 depicts a timing chart of the photovoltaic panel of the disclosure.

FIG. 4 depicts a timing chart of the photovoltaic panel of the disclosure. FIG. 4 corresponds to FIG. 3 to illustrate the photovoltaic inverter 30. As shown in FIG. 4, when the photovoltaic panel 38 is irradiated (e.g., after dawn), the photovoltaic panel 38 is automatically turned on and the photovoltaic inverter 30 enters a startup period PS. During the startup period PS, the storage element 35 of the buffering element 33 stores the energy output from the photovoltaic panel 38 first because the initial state of the switching element 36 is the close-circuit state. When the controller 31 detects that the open-circuit voltage exceeds the voltage V1 (i.e., the luminance of the sunlight is high enough such that the voltage output from the photovoltaic panel 38 is not lower than the startup voltage due to turning off the auxiliary power 32), the photovoltaic inverter 30 enters a period P1 from the startup period PS and the controller 31 enables the switching element 36 to be in the open-circuit state such that the storage element 35 of the buffering element 33 stops storing the energy output from the photovoltaic panel 38 and provides the stored energy to the auxiliary power 32 thereby performing the maximum power point tracking procedure on the photovoltaic panel 38 by the controller 31.

When the controller 31 performs the maximum power point tracking procedure on the photovoltaic panel 38 and the controller 31 detects that the voltage output from the photovoltaic panel 38 is lower than the voltage V2, the photovoltaic inverter 30 enters a period P2 from the period P1 and the controller 31 enables the switching element 36 to be in the close-circuit state, such that the buffering element 33 directly feeds the energy output from the photovoltaic panel 38 to the auxiliary power 32 thereby continuously performing the maximum power point tracking procedure on the photovoltaic panel 38 by the controller 31.

When the controller 31 performs the maximum power point tracking procedure on the photovoltaic panel 38 and the controller 31 detects that the voltage output from the photovoltaic panel 38 is lower than the voltage V3 (i.e., the startup voltage of the auxiliary power 32), the photovoltaic inverter 30 enters a period P3 from the period P2. The controller 31 enables the switching element 36 to be in the open-circuit state and turns on the boost converter 37 such that the boost converter 37 of the buffering element 33 increases the voltage output from the photovoltaic panel 38 to the voltage V3 and provides the voltage V3 to the auxiliary power 32, thereby continuously performing the maximum power point tracking procedure on the photovoltaic panel 38 by the controller 31.

When the photovoltaic panel 38 is not irradiated by the sunlight (e.g., at night), the photovoltaic panel 38 is turned off such that the photovoltaic inverter 30 is also turned off and the switching element 36 is in the close-circuit state, thereby directly charging the storage element 35 by the photovoltaic panel 38 during the startup period PS (e.g., dawn). The controller 31 does not perform the maximum power point tracking procedure on the photovoltaic panel 38 until the period P1.

In general, the switching element 36 is switched according the controller 31 during the startup period PS, the period P1, the period P2 and the period P3, such that the switching element 36 is in the close-circuit state during the startup period PS and the period P2 and in the open-circuit state during the period P1 and the period P3.

In some embodiments, during the period P2, when the voltage output from the storage element 35 is the voltage V2, the controller 31 enables the switching element 36 to be in the open-circuit state, such that the storage element 35 stops storing the energy output from the photovoltaic panel 38 and provides the stored energy to the auxiliary power 32. When the voltage output from the storage element 35 exceeds the voltage V3, the controller 31 enables the switching element 36 to be in the close-circuit state such that the storage element 35 stores the energy output from the photovoltaic panel 38 and directly feeds the energy output from the photovoltaic panel 38 to the auxiliary power 32. Thus, the auxiliary power 32, which is designed to have the best conversion efficiency in the voltage V3, has the better conversion efficiency.

Figure 5:
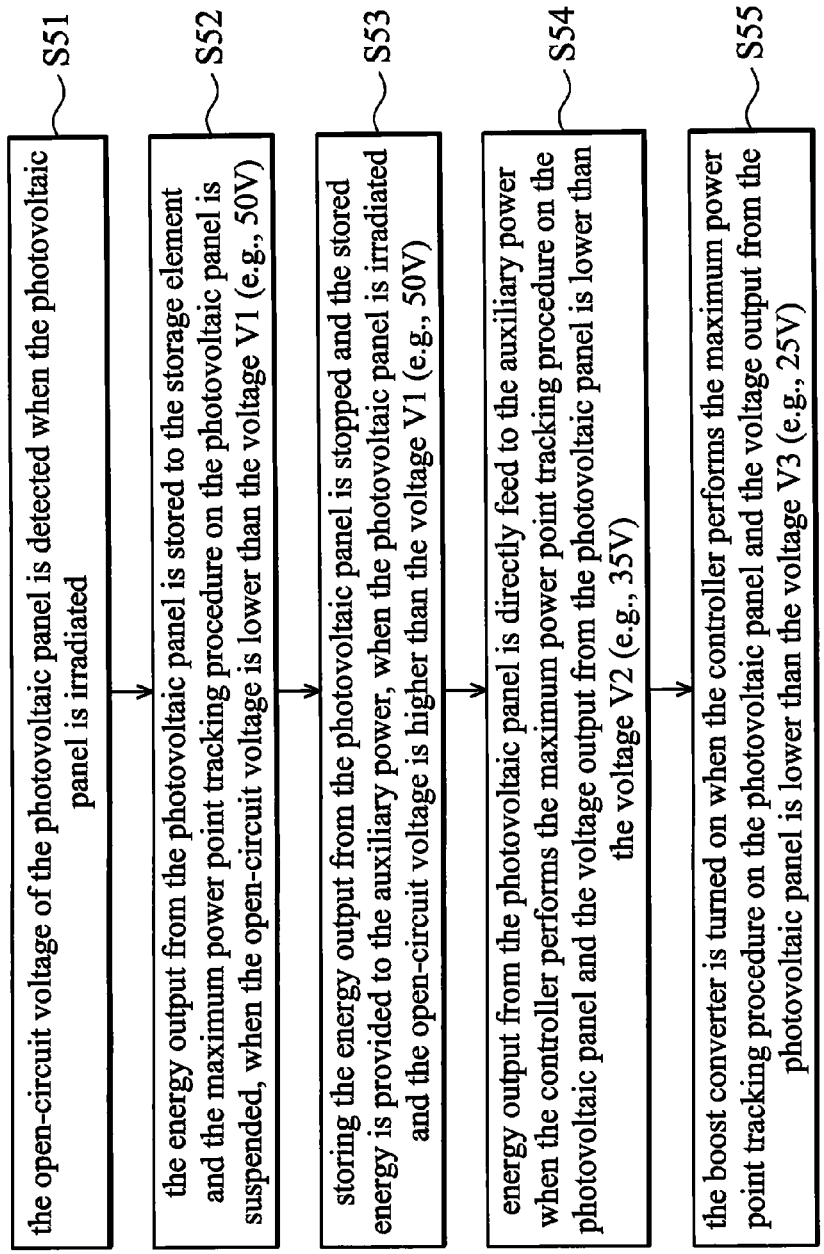
FIG. 5 depicts a flowchart of the method for controlling photovoltaic inverters of the disclosure.

FIG. 5 depicts a flowchart of the method for controlling photovoltaic inverters of the disclosure. As shown in FIG. 5, the method for controlling photovoltaic inverters includes the following steps.

In step S51, the open-circuit voltage of the photovoltaic panel 38 is detected when the photovoltaic panel 38 is irradiated (i.e., turned on). In step S52, the energy output from the photovoltaic panel 38 is stored to the storage element 35 and the maximum power point tracking procedure on the photovoltaic panel 38 is suspended, when the open-circuit voltage is lower than the voltage V1. In step S53, storing the energy output from the photovoltaic panel 38 is stopped and the stored energy is provided to the auxiliary power 32, when the photovoltaic panel 38 is irradiated and the open-circuit voltage is higher than the voltage V1, thereby performing the maximum power point tracking procedure on the photovoltaic panel 38 by the controller 31.

In step S54, energy output from the photovoltaic panel 38 is directly feed to the auxiliary power 32 when the controller 31 performs the maximum power point tracking procedure on the photovoltaic panel 38 and the voltage output from the photovoltaic panel 38 is lower than the voltage V2, thereby continuously performing the maximum power point tracking procedure on the photovoltaic panel 38 by the controller 31. In step S55, the boost converter 37 is turned on such that the boost converter 37 increases the voltage output from the photovoltaic panel 38 to the voltage V3 and provides the voltage V3 to the auxiliary power 32, thereby continuously performing the maximum power point tracking procedure on the photovoltaic panel 38 by the controller 31, when the controller 31 performs the maximum power point tracking procedure on the photovoltaic panel 38 and the voltage output from the photovoltaic panel 38 is lower than the voltage V3. In this embodiment, the voltage V1 is higher than the voltage V2 and the voltage V2 is higher than the voltage V3. For example, the voltage V1 can be 50V, 51V or 52V, etc. The voltage V2 can be 25V, 26V or 27V, etc, but is not limited thereto.

In summary, the disclosure suspends/the maximum power point tracking procedure on the photovoltaic panel 38 and stores the energy output from the photovoltaic panel 38 in the storage element 35 during the startup period PS (i.e., the luminance of the sun is not high enough) such that the photovoltaic inverter 30 is prevented from turning on and off repeatedly. The disclosure provides that the energy is stored in the storage element 35 to the auxiliary power 32 during the period P1 (i.e., the difference between the voltage of the input terminal of the auxiliary power 32 and the voltage of the best conversion efficiency of the auxiliary power 32 is so much). The disclosure also provides that the energy output from the photovoltaic panel 38 is directly fed to the auxiliary power 32, when the voltage output from the photovoltaic panel 38 exceeds the voltage V2 (compared with the voltage V1, the voltage V2 is nearer to the voltage of the best conversion efficiency of the auxiliary power 32), thereby improving the conversion efficiency of the auxiliary power 32.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A photovoltaic inverter, comprising:
    a controller;
    an auxiliary power, providing power to the controller; and
    a buffering element, coupled between a photovoltaic panel and the auxiliary power such that the buffering element stores energy output from the photovoltaic panel first during a startup period, and then stops storing energy output from the photovoltaic panel and provides the stored energy to the auxiliary power, thereby performing a maximum power point tracking procedure on the photovoltaic panel during a first period following the startup period, and feeds energy output from the photovoltaic panel to the auxiliary power during a second period following the first period thereby continuously performing the maximum power point tracking procedure on the photovoltaic panel by the controller.

2. The photovoltaic inverter as claimed in claim 1, wherein the photovoltaic inverter enters the first period from the startup period when the open-circuit voltage of the photovoltaic panel exceeds a first voltage.

3. The photovoltaic inverter as claimed in claim 2, wherein the photovoltaic inverter enters the second period from the first period when the controller performs the maximum power point tracking procedure on the photovoltaic panel and the voltage output from the photovoltaic panel is lower than a second voltage.

4. The photovoltaic inverter as claimed in claim 3, wherein the photovoltaic inverter enters the third period from the second period when the controller performs the maximum power point tracking procedure on the photovoltaic panel and the voltage output from the photovoltaic panel is lower than a third voltage.

5. The photovoltaic inverter as claimed in claim 4, wherein the buffering element increases the voltage output from the photovoltaic panel to the third voltage and provides the third voltage to the auxiliary power during the third period.

6. The photovoltaic inverter as claimed in claim 4, wherein the first voltage is higher than the second voltage and the second voltage is higher than the third voltage.

7. The photovoltaic inverter as claimed in claim 2, wherein the buffering element comprises a boost converter, raising the voltage output from the photovoltaic panel to the third voltage.

8. The photovoltaic inverter as claimed in claim 2, further comprising an inverter, adjusting the voltage and current output from the photovoltaic panel according to the controller, thereby obtaining maximum power.

9. The photovoltaic inverter as claimed in claim 1, wherein the buffering element comprises:
    a storage element, storing the energy output from the photovoltaic panel; and
    a switching element, coupled between the photovoltaic panel and the storage element, switching during the first, second and third periods.

10. The photovoltaic inverter as claimed in claim 9, wherein the switching element is in a close-circuit state during the startup period and the second period, and is in an open-circuit state during the first period and the third period.

11. A photovoltaic inverter, comprising:
    a controller, detecting an open-circuit voltage of a photovoltaic panel;
    an auxiliary power, providing power to the controller; and
    a buffering element, coupled between the photovoltaic panel and the auxiliary power, wherein the controller enables the buffering element to store energy output from the photovoltaic panel and suspends a maximum power point tracking procedure on the photovoltaic panel when the photovoltaic panel is irradiated and the open-circuit voltage is lower than a first voltage.

12. The photovoltaic inverter as claimed in claim 11, wherein the buffering element comprises a switching element and a storage element, the switching element is in an open-circuit state such that the buffering element stops storing the energy output from the photovoltaic panel and provides the stored energy to the auxiliary power, thereby performing the maximum power point tracking procedure on the photovoltaic panel by the controller, when the photovoltaic panel is irradiated and the open-circuit voltage is higher than the first voltage.

13. The photovoltaic inverter as claimed in claim 12, wherein the switching element is in a close-circuit state such that the buffering element directly feeds the energy output from the photovoltaic panel to the auxiliary power, thereby continuously performing the maximum power point tracking procedure on the photovoltaic panel by the controller, when the controller performs the maximum power point tracking procedure on the photovoltaic panel and the voltage output from the photovoltaic panel is lower than a second voltage.

14. The photovoltaic inverter as claimed in claim 13, wherein the buffering element further comprises a boost converter, the switching element is in the open-circuit state and the controller turns on the boost converter such that the boost converter increases the voltage output from the photovoltaic panel to the third voltage and provides the third voltage to the auxiliary power, thereby continuously performing the maximum power point tracking procedure on the photovoltaic panel by the controller when the controller performs the maximum power point tracking procedure on the photovoltaic panel and the voltage output from the photovoltaic panel is lower than the third voltage.

15. The photovoltaic inverter as claimed in claim 14, wherein the first voltage is higher than the second voltage and the second voltage is higher than the third voltage.

16. The photovoltaic inverter as claimed in claim 11, further comprising an inverter, adjusting the voltage and current output from the photovoltaic panel according to the controller, thereby obtaining maximum power.

17. A method for controlling photovoltaic inverters, comprising:
   detecting an open-circuit voltage of a photovoltaic panel when the photovoltaic panel is irradiated; and
   storing energy output from the photovoltaic panel to a storage element and suspending a maximum power point tracking procedure on the photovoltaic panel when the open-circuit voltage is lower than a first voltage.

18. The method as claimed in claim 17, further comprising:
   stopping storing the energy output from the photovoltaic panel and providing the stored energy to the auxiliary power when the photovoltaic panel is irradiated and the open-circuit voltage is higher than the first voltage, thereby performing the maximum power point tracking procedure on the photovoltaic panel by the controller.

19. The method as claimed in claim 18, further comprising:
   feeding energy output from the photovoltaic panel to the auxiliary power directly when the controller performs the maximum power point tracking procedure on the photovoltaic panel and the voltage output from the photovoltaic panel is lower than a second voltage, thereby continuously performing the maximum power point tracking procedure on the photovoltaic panel by the controller.

20. The method as claimed in claim 19, further comprising:
   turning on a boost converter such that the boost converter increases the voltage output from the photovoltaic panel to a third voltage and provides the third voltage to the auxiliary power, thereby continuously performing the maximum power point tracking procedure on the photovoltaic panel by the controller when the controller performs the maximum power point tracking procedure on the photovoltaic panel and the voltage output from the photovoltaic panel is lower than the third voltage.

\* \* \* \* \*